United States Patent [19]

White

[11] 3,933,957

[45] Jan. 20, 1976

[54] PROCESS FOR PRODUCING SHAPED ARTICLES FROM AN ACETYLENIC POLYMER

[75] Inventor: Dwain M. White, Schenectady, N.Y.

[73] Assignee: General Electric Company, Schenectady, N.Y.

[22] Filed: Sept. 4, 1973

[21] Appl. No.: 394,168

[52] U.S. Cl............ 264/29; 260/32.4; 260/33.6 UA; 260/33.8 UA; 423/448; 423/449
[51] Int. Cl.$^2$................,...... B29C 25/00; C08K 5/03
[58] Field of Search... 260/33.6 UA, 33.8 UA, 32.4; 264/29; 423/447, 448, 449

[56] References Cited
UNITED STATES PATENTS

| | | | |
|---|---|---|---|
| 3,300,456 | 1/1967 | Hay................................ | 260/88.2 D |
| 3,709,863 | 1/1973 | White et al........................ | 260/30.2 |

Primary Examiner—Lorenzo B. Hayes
Attorney, Agent, or Firm—F. Wesley Turner; Joseph T. Cohen; Jerome C. Squillaro

[57] ABSTRACT

When a hot, homogeneous solution containing at least 4 percent by weight of a copolymer of a diethynylbenzene and a dipropargyl ether of a dihydric phenol in nitrobenzene or a liquid halobenzene solvent is allowed to cool in contact with a shaping surface, a shaped gel is formed. Contacting the shaped article with a lower alkyl ketone which is a nonsolvent for the acetylenic polymer but in which the halobenzene is soluble and then allowing the shaped object to dry causes the gel to shrink isotropically so that it retains the shape, although diminished in size, which it assumed on solidifying. If the halobenzene solvent is crystalline at room temperature, the solvent crystallizes in the polymer matrix as it cools. Extraction with a lower alkyl ketone or sublimation of the solvent crystals produces a shaped article having a microporous structure. The shaped articles are readily converted by heating in an inert atmosphere to the same shaped carbon articles which can be amorphous, vitreous or graphitic depending on the heating schedule and the maximum temperature to which the articles are heated.

12 Claims, No Drawings

PROCESS FOR PRODUCING SHAPED ARTICLES FROM AN ACETYLENIC POLYMER

BACKGROUND OF THE INVENTION

1. Field of the Invention

This invention relates to a process for producing articles having a desired shape, e.g. tubes, rods, plates, crucibles, gaskets, etc., from acetylenic polymers and, where desired, thermolyzing such shaped objects to produce carbon objects having the same shape. More particularly, this invention relates to a process which involves preparing a hot solution of the polyacetylene in nitrobenzene or a halobenzene solvent having a boiling point greater than 100°C., allowing the hot solution to cool in contact with at least one shaping surface, for example, a mold, a casting surface, etc., to a temperature where the solution solidifies to produce either the desired final shape or to produce an intermediate shape which is then converted to a final shape, for example, by cutting, carving, heat forming, boring etc., and thereafter removing the solvent from the solidified final shape. On heating these shaped articles to an elevated temperature the acetylenic polymer decomposes to carbon without changing shape and little, if any, change in size. Once carbonized, the articles can be converted to either vitreous carbon or graphite articles without change in shape and little, if any, change in size, by heating using known vitrifying or graphitizing conditions.

2. Description of the Prior Art

Polyacetylenes are relatively new polymers having many interesting and desirable properties. They were first described by Allen S. Hay in J. Org. Chem. 25, 1275 (1960) and 27, 2320 (1962). Subsequently, a much broader class of polyacetylenes was disclosed and claimed in Hay's U.S. Pat. Nos. 3,300,456, 3,332,916 and 3,594,175. Using Hay's process of oxidatively coupling compounds having two acetylenic groups, Sladkov et al. likewise prepared polyacetylenes which they describe in Bull. Acad. Sci. U.S.S.R. — Div. Chem. Sci., English Translation [7] 1220 (1963). All these polymers and copolymers described in this prior art have, as a common property, a butadiynylene group, i.e., $-C \equiv C-C \equiv C-$, dispersed along the polymer backbone. They also have in common the fact that they are formed by oxidative coupling of organic compounds having two ethynyl groups, i.e., $-C \equiv CH$. In the oxidative coupling reaction, thoroughly described by Hay in his above patents and publications, the hydrogen is removed from the ethynyl groups by the oxidation reaction to form water and one of the resulting ethynylene groups of one molecule is joined to one of the resulting ethynylene groups of another molecule to form the butadiynylene groups of the polymer molecule. It is these latter groups which cause the polymers to be very thermally unstable and photosensitive and which tend to make the polymer difficulty soluble in common solvents for polymers.

It is obvious that these polyacetylenes are entirely different in kind than polymers containing isolated ethynylene groups in the polymer molecule. Typical of such polymers are the polyesters obtained by esterification of an acetylenic dicarboxylic acid and a glycol or esterification of a polycarboxylic acid with an alkynediol and polyethers obtained by the reaction of acetylenic glycols with dialkyl acetals or with alkyl-halohydrins. These polymers have ethynylene, but not butadiynylene groups, along the polymer backbone. Such polymers are not included in the term polyacetylenes.

Because of their thermal instability, it is impossible to mold articles from the polyacetylenes using heat and pressure. Those polyacetylenes which are at least soluble in hot solvents can be cast into films by well known solution-casting techniques, spun into fibers by spinning a solution of the polymer by well-known solution-spinning techniques or by extruding the powdered polymer which has been blended with a sufficient amount of a plasticizing solvent so that the polymer can be extruded at a temperature below its thermal decomposition temperature. Any of these shaped articles can be thermally decomposed to convert them into a carbon film or fiber which can be graphitized. It would be highly desirable to be able to form the acetylenic polymers into articles having their shapes which also could be converted to carbon articles of the same shape, especially those having substantial mass or cross-section.

DESCRIPTION OF THE INVENTION

I have now found that a hot homogeneous solution containing at least 4% by weight of an acetylenic polymer, whose composition on a weight basis is 5–20% of a dipropargyl ether of a dihydric phenol and 80–95% of a diethynyl benzene, of which 0–12% is the para-isomer and the balance is the meta-isomer, in nitrobenzene or a halobenzene solvent which, at room temperature, is entirely liquid or crystalline and has a boiling point higher than 100°C. at atmospheric pressure can be cooled in contact with at least one shaping surface, for example, a mold, a rotating surface, e.g., a disk or cylinder, a casting plate or belt, etc., to a temperature where the solution congeals to a solid containing the polymer and the solvent. The shape of any surface area in contact with the shaping surface, is a negative of the shape of the shaping surface. If nitrobenzene or a halobenzene solvent is used, which is liquid at room temperature, a gel is formed whereas a polymer matrix having crystals of the halobenzene solvent dispersed throughout is formed if a crystalline halobenzene solvent is used.

The size or shape of these articles can be still further modified, if desired, by cutting, carving, slicing, boring, etc., to yield the desired final shape, for example, crucibles, pans, sheets, plates, rods, tubes, gaskets, beakers, etc. When the solvent is nitrobenzene or a halobenzene which is a liquid at room temperature, it can be extracted from the shaped article with a wide variety of liquids which are a solvent for the halobenzene but a non-solvent for the acetylenic polymer but it is only when a lower alkyl ketone is used as this liquid that the shaped article shrinks isotropically so that it retains the same shape, although diminished in size, that it had prior to extraction. The amount of shrinkage is directly related to the percent of solvent removed and the percentage of solvent initially present.

When the halobenzene is a crystalline solid at room temperature, it can also be removed by extraction with a lower alkyl ketone or by sublimation, leaving the polymer as a porous mass whose shape and porosity is retained even upon carbonization, vitrification or graphitization. The degree of porosity increases as the amount of removable solvent increases.

Crystallization of the solvent tends to cause cracking of very thick sections. The tendency to crack increases as the ratio of volume of crystals per unit volume of the congealed solid increases and therefore is minimized by using high concentrations of the polymer in the solvent. Because of the tendency to crack, the use of solutions where the solvent is a halobenzene which is crystalline at room temperature, from a practical standpoint, is limited to forming shapes having large surface area to volume ratios generally shapes having a maximum material thickness of ca. 200–250 mils but the material thickness need not be uniform and there is no limitation on the other dimensions. By "material thickness" I mean the thickness of the material in any section forming a part of the structural configuration of the article, e.g., the thickness of any walls, including, partitions, dividers, etc., of a volume-defining shape (for example, the wall thickness of a tube, a partitioned pan, etc.), the thickness of any non-volume defining shape (for example, the thickness of a flat or corrugated sheet) etc. The material thickness does not need to be uniform throughout the solid, i.e., the thickness of one section can be different from that of another section of the same article or even the thickness of one wall can vary or be non-uniform, as long as the maximum is not exceeded.

As would be expected from the porous nature of these articles, the amount of shrinkage which occurs on removal of the solvent is less than that which occurs when the solvent is extracted to produce the previously described non-porous articles and is not isotropic. Shrinkage is greater in the material thickness dimension than it is in the other directions.

For some unexplained reason, solvent extraction of the crystals of solvent results in greater shrinkage in all dimensions than when the crystals are removed by sublimation. Therefore, the latter method of solvent removal is to be preferred when it is desired to minimize shrinkage and maximize the porosity for any given concentration of polymer in the hot solution used to form the shaped article. As will be obvious, the ratio of the volume of crystals per volume of congealed solid will increase as the concentration of the polymer in the hot solution used to form the solid decreases.

The porous articles, before or after carbonization, can be used as filters, diffusion barriers or they can be impregnated either before or after carbonization with various impregnants, either liquids or solids, resins, waxes, combustible fuels, solutions of noble metals which upon heating (simultaneously with carbonization of the polymer, if desired) are reduced to metals thereby providing a metal impregnated porous carbon structure useful as supported catalyst structure, or as an electrode in such devices as fuel cells and batteries.

The sublimation of the solvents which are crystalline at room temperature from the shaped articles can be carried out at any desired temperature below that temperature where the crystals melt or the mass liquefies. The rate of sublimation can be increased by increase in temperature, use of a vacuum, increase in rate of gas flow over the article, combinations thereof, etc.

The extraction of the nitrobenzene or halobenzene solvents from the shaped articles can be done by immersion in a lower alkyl ketone which is replaced periodically until no more solvent is extracted and it can be carried out at any temperature below the temperature where any solvent remaining in the polymer, would cause the polymer to dissolve. Where this temperature is above the boiling point of the particular ketone extractant, then the condensing vapor technique can be used as exemplified by the use of a Soxhlet extractor. The lower alkyl ketones are unique in causing the congealed solid to shrink isotropically. Some shrinkage occurs on extraction but most occurs on evaporation of the ketone. Other closely related extractants such as alcohols, ethers, etc., cause non-uniform shrinkage, distortion and, quite often, crack formation.

Although there are other known solvents for the particular acetylenic copolymer other than nitrobenzene or the halobenzenes, for example, tetrachloroethane, etc., they can not be extracted even with lower alkyl ketones without causing nonumiform shrinkage and, in many cases, crack formation. Halobiphenyls and halobisphenyl ethers can be used in place of the nitrobenzene or halobenzenes, but require longer extraction time and, therefore, are much less desirable.

Nitrobenzene or any halobenzene which is liquid at room temperature can be used as the extractable solvent and any halobenzene which is crystalline at room temperature can be used as the extractable or sublimable solvent. From a practical standpoint, only the p-dihalobenzenes have a sufficiently high vapor pressure that they are easily removed by sublimation. The liquid halobenzene may be either the pure liquid halobenzene or a mixture of two or more. In addition, the mixtures may include one or more halobenzenes which, per se, are crystalline solids but are liquid in admixture with the other halobenzene or halobenzenes present in the mixture.

Typical of the liquid halobenzenes which I can use are chlorobenzene, bromobenzene, iodobenzene, the ortho and meta isomers of (a) dichlorobenaene, (b) dibromobenzene, (c) fluoroiodobenzene, (d) chlorofluorobenzene, (e) fluorobromobenzene, (f) bromofluorobenzene, the para isomers of (a) bromofluorobenzene, (b) fluoroiodobenzene, 1,2,4-trichlorobenzene, etc., and mixtures thereof. Typical examples of the crystalline halobenzene that I may use are the para isomers of: (a) dichlorobenzene, (b) dibromobenzene, (c) diiodobenzene, (d) bromochlorobenzene, (e) bromoiodobenzene, (f) chloroiodobenzene, 1,2,3- and 1,3,5-trichlorobenzene, etc. Only the fluorobenzenes, i.e. mono- to hexafluorobenzene are halobenzenes having boiling points below 100°C. at 760 mm pressure. They are poor solvents for the polymer.

A typical example of a mixture of crystalline and liquid halobenzene which is a liquid at room temperature and therefore can be used as the liquid halobenzene solvent is the mixture of meta and para dichlorobenzene having no more than about 55% of the para isomer.

The various tri-, tetra-, penta- and hexahalobenzenes can also be used alone or as mixtures. However, they do not offer any advantage over the dihalobenzenes so the latter are generally preferred. Since the particular solvent chosen has no effect on the results obtained in the final product other than the difference between liquids and crystalline solvents previously discussed, and since nitrobenzene and the chlorobenzenes, both the mono and dichlorobenzenes, are more readily available, cheaper and very satisfactory, I perfer to use them as the solvent. The dichlorobenzenes are better solvents than the monochlorobenzene. The ortho- and meta- isomers are preferred when it is desired to use most concentrated solutions in forming the objects which shrink the least when the solvent is extracted. The para-isomer is the preferred solvent which is crystalline at room temperature since it has a relatively high vapor pressure for a solid which is of advantage in its removal by sublimation.

The acetylenic polymer is best prepared by oxidatively coupling with oxygen or an oxygen containing gas, a mixture of from 5–20% of a dipropargyl ether of a dihydric phenol and 80–95% of a diethynylbenzene, of which 0–12% is the para-isomer and the balance is the metaisomer, in the presence of a basic cupricamine complex in a suitable solvent according to the method disclosed by Hay in his above-referenced patents or in my U.S. Pat. No. 3,709,863 which are hereby incorporated by reference for more complete disclosure of the method used in forming the acetylenic polymers.

The diethynylbenzenes which I can use are those having the formula

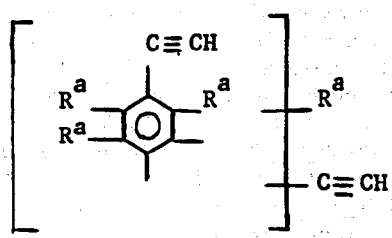

where $R^a$ is hydrogen, halogen or lower alkyl. When polymerized, they produce repeating units having the formula

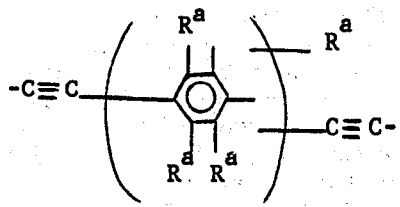

This latter formula can be condensed to —C≡C—R—C≡C— where R is phenylene having from 0–4 halo or lower alkyl substituents, said phenylene being 0–12% p-phenylene and the balance being m-phenylene.

The dipropargyl ethers of dihydric phenols which I can use have the formula

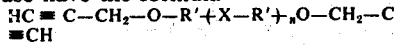

where $n$ is 0 or 1, R' is phenylene, i.e. o m or p-phenylene having from 0–4 halo or lower alkyl substituents, and X is a direct bond joining the two R' groups, —O—,

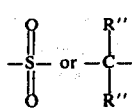

where R'' is hydrogen or lower alkyl. When polymerized, they produce repeating units having the formula

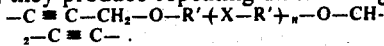

In order for the polymer to have any useful properties, it must have at least 10 and preferably at least 50 repeating units.

Examples of the diethynylbenzenes which I can use in preparing the acetylenic polymers are m-diethynylbenzene, p-diethynylbenzene, and these same diethynylbenzenes having from 1–4 halo or lower alkyl substituents, for example, chlorine, bromine, iodine, fluorine, methyl, ethyl, propyl, isopropyl, the various butyl groups, i.e., n-butyl, sec-butyl, tert-butyl, 2-methylpropyl, cyclobutyl, etc., the various pentyl groups, the various hexyl groups, the various heptyl groups, the various octyl groups. Typical examples of such diethynyl benzenes are the diethynyltoluenes, the diethynylxylenes, the diethynylethylbenzenes, the diethynylbutylbenzenes, the diethynylchlorobenzenes, the diethynylchlorotoluenes, the diethynyldichlorobenzenes, the diethynylbromobenzenes, etc., wherein the diethynyl groups are in the meta or para relationship to each other. The meta- and paraisomers of diethynyl benzene are preferred because they are cheapest, most readily available, have the highest carbon content and are very satisfactory.

The dipropargyl ethers of this invention are readily prepared by reacting the desired dihydric phenol with a propargyl halide in the presence of a base, e.g., alkali metal and alkaline earth metal hydroxides, carbonates, bicarbonates, etc. Since an alkali metal hydroxide reacts with the phenol to produce a salt of the phenol, the preformed alkali metal salt of the hydric phenol also can be used.

The dihydric phenols, which can be used to form the dipropargyl ethers can be dihydric phenols of the benzene series, e.g., hydroquinone, resorcinol, catechol; dihydroxy-substituted biphenyls, e.g., 2,2'-biphenol, 2,3'-biphenol, 2,4'-biphenol, 3,3'-biphenol, 3,4'-biphenol, 4,4'biphenol; bis(hydroxyphenyl) ethers, e.g., bis(2-hydroxyphenyl) ether, bis(3-hydroxyphenyl) ether, bis(4-hydroxyphenyl) ether, 2-(3-hydroxyphenoxy)phenol, 2-(4-hydroxyphenoxy)phenol, 3-(2-hydroxyphenoxy-phenol, 3-(4hydroxyphenoxy)phenol; bis(hydroxyphenol)sulfones, e.g., bis(2-hydroxyphenyl)sulfone, bis(3-hydroxyphenyl)sulfone, bis(4-hydroxyphenyl)sulfone or the various dihydric phenols known as alkylene- or alkylidenediphenols, e.g., 4,4'-isopropylidenediphenol, 2,2'-isopropylidenediphenol, 2,4'-isopropylidenediphenol, methylenediphenol, ethylenediphenol, ethylidenediphenol, 4,4'-(isopropylethylene)diphenol, etc., including the above dihydric phenols wherein from 1 up to the total number of hydrogens on the benzene ring are replaced by halogen or a lower alkyl group, e.g., chlorohydroquinone, bromohydroquinone, tetrachlorohydroquinone, methylhydroquinone, ethylhydroquinone, isopropylhydroquinone, butylhydroquinone, pentylhydroquinone, hexylhydroquinone, including cyclohexylhydroquinone, heptylhydroquinone, octylhydroquinone, etc., the corresponding halo and lower alkyl substituted catechols and resorcinols, the halogen and lower alkyl substituted biphenols, the halogen and lower alkyl substituted bis(hydroxyphenyl)sulfones, the halogen and lower alkyl substituted alkylene- and alkylidenebiphenols, etc. The dipropargyl ether of 4,4'-isopropylidenediphenol is preferred since its diphenol is the cheapest, most readily available and the dipropargyl ether is very satisfactory in preparing the copolymers of this invention.

The acetylenic groups of the monomers are not destroyed during the polymerization process, which is actually an oxidative coupling reaction in which the hydrogen on the terminal acetylenic groups of the monomer are removed and oxidized to water and the acetylenic group of one monomer unit is joined to the acetylenic group of another monomer unit. Monoacetylenic compounds, e.g. phenylacetylene, methylacetylene, etc., can be used as chain stoppers to modify and control the molecular weight.

In carrying out the polymerization, a solvent is used in which the basic cupric-amine complex and the monomeric acetylenes are soluble. If the polymer is not soluble, it precipitates at that point where its molecular weight has increased sufficiently that it is no longer soluble. If the polymer is soluble in the solvent or partially soluble, that remaining in solution can be recovered by pouring the solution into an excess of a liquid which is miscible with the solvent used for polymerization but in which the polymer is insoluble. Methyl or ethyl alcohol are readily available liquids suitable for this purpose. The precipitated polymer, whether formed during polymerization or by dilution with non-solvent, is readily removed by filtration.

Since the halobenzenes are excellent solvents for the polymer, they can be used as the solvent system for carrying out the polymerization of the monomer mixture to form the polymers of this invention. In this case, the polymerization reaction mixture can be used directly to form the shaped articles without any necessity for isolating the polymer from the polymerization reaction mixture. When this is done, it is obvious that the amount of monomer and solvent are so chosen to give the desired concentration of polymer in the polymerization reaction mixture and the polymerization is carried out at a temperature sufficiently high that the reaction mixture stays fluid, but not necessarily clear and homogeneous, although the latter is preferable.

I have found that it is not necessary to remove the catalyst system from the polymerization reaction mixture prior to forming the shaped article. In the case where a halobenzene solvent is used which is liquid at room temperature, extraction of the solvent from the congealed solid with the lower alkyl ketone simultaneously extracts the catalyst system. In the case where the halobenzene is a crystalline solid at room temperature, sublimation removes the amine moiety of the catalyst but not the copper moiety. Many of the applications for the foam structure made by this process can take advantage of the copper residue in the shaped object. Where it is desirable to remove the copper residue, this can be done either by extracting it from the solution prior to casting or from the final structure using, for example, an aqueous mineral acid solution for the extraction. Another alternative, is to use a catalyst-free polymer which has been isolated from the polymerization reaction mixture and then dissolved in the solvent.

Within the composition range of the polymers of this invention, those having the maximum amount of the meta isomer of the diethynylbenzene and the minimum amount of the dipropargyl ether are the least soluble. The solubility increasing as both the amount of the para isomer of the diethynylbenzene and the amount of the dipropargyl ether increases so that the polymer having the maximum amount of the dipropargyl ether and the maximum amount of para isomers of diethynylbenzene and the minimum amount of the meta isomer of the diethynylbenzene are the most soluble.

One method of measuring the solubility which I have found quite convenient to use is to prepare a 1% by weight solution of the polymer in o-dichlorobenzene. The solution is heated to a temperature where it is clear and homogeneous and then permitted to cool slowly with stirring to maintain the entire mass at a uniform temperature. The temperature at which haziness is first noted is a measure of the solubility of the polymer with the polymer having the highest haze temperature being the least soluble. With the polymers of this invention, further cooling causes an increase in haziness, but no actual separation of a solid phase. By at least the time the solution has reached room temperature, the solution has become a solid, nonflowig gel.

As illustrations of the variation of solubility of the polymers within the composition range of this invention, the haze temperature of the polymer obtained by copolymerizing 95% m-diethynylbenzene and 5% by weight of the dipropargyl ether of 4,4'-isopropylidenediphenol is about 90°C. Keeping the concentration of the dipropargyl ether constant and changing the diethynylbenzene from the pure meta isomer to a mixture of 83.6% of the meta isomer and 11.4% of the para isomer (12% of the total diethynylbenzene) lowers the haze temperature to 50°C. For a copolymer made by copolymerizing a mixture of 80% m-diethynylbenzene and 20% of the dipropargyl ether of 4,4'-isopropylidenediphenol, the haze temperature is 60°C. which is reduced to 25°C. by changing the diethynylbenzene from pure meta isomer to a mixture of 70.4% of the meta isomer and 9.6% of the para isomer (12% of the total diethynylbenzene).

Those polymers having the lower haze temperature when used with a halobenzene solvent which is liquid at room temperature will produce shaped articles after extraction of the solvent which are more translucent than a polymer having a higher haze temperature. However, this becomes unimportant for those shaped articles which are later converted into carbon articles.

When a halobenzene solvent is used which is crystalline at room temperature, the hot solution remains clear until the melting point of the halobenzene is reached at which point the crystals of the solvent start to form simultaneously with the formation of the gel structure so that a gel is formed having crystals of the solvent uniformly dispersed throughout.

Regardless of which type of halobenzene is used as a solvent, sufficient polymer must be dissolved in the polymer to give a 4% by weight solution of the polymer in the solvent in order that the gel structure which forms has sufficient firmness and strength to it that it can be removed from the shaping surface and subsequently handled during the solvent removal step without fracturing. During cooling a slight contraction occurs which greatly facilitates removal from the shaping surface. As wil be readily apparent to anyone skilled in the art, the amount of the acetylenic polymer dispersed in the solvent should not be such as to exceed the solubility limit of the polymer in the particular solvent for the particular temperature to which it is to be heated, i.e., the amount of polymer should not exceed that amount which would give a saturated solution of the polymer at the maximum temperature to which the solution is to be heated.

DESCRIPTION OF THE PREFERRED EMBODIMENTS

In order that those skilled in the art may more readily understand my invention, the following examples are given by way of illustration and not by way of limitation. In all the examples, percentages are by weight and temperatures are degrees Celsius.

EXAMPLE 1

A terpolymer was prepared from a mixture of 82% m-diethynylbenzene, 8% p-diethynylbenzene and 10% of the dipropargyl ether of 4,4'-isopropylidenediphenol by the following procedure. A solution of 0.5 g. of the dipropargyl ether of 4,4'-isopropylidenediphenol, 4.1 g. of m-diethynylbenzene and 0.4 g. of p-diethynylbenzene in 25 g. of o-dichlorobenzene was added with stirring to a solution of 0.15 g. of cuprous chloride, 0.18 g. of N,N,N',N'-tetramethylethylenediamine, 1.7 g. of pyridine and 75 g. of o-dichlorobenzene heated to 60° and through which a dispersed stream of oxygen was being passed. Over a period of two minutes, the temperature rose to 88.5° and became extremely viscous. After 10 minutes, heating and the flow of oxygen was stopped. After cooling to room temperature, the solution was poured into an excess of methanol containing a trace of hydrochloric acid to precipitate the acetylenic polymer.

Two solutions, one 5% the other 10%, of this polymer in p-dichlorobenzene were made by heating the mixtures with stirring to 120° until clear solutions were formed. These solutions were poured onto glass casting surfaces to form plates approximately 2 inches × 3 inches × 20 mils. During cooling, the layer became opaque and the paradichlorobenzene crystallized. At room temperature, each plate was opaque and had sufficient strength that it was readily removed from the casting surface on which it had been formed. Some shrinkage occurred when the samples solidified and during the cooling to 25° but no cracks or other destruction of the cast plate occurred. These plates were subjected to 0.1 millimeter vacuum at room temperature to remove the p-dichlorobenzene leaving the polymer as a porous structure. Data on the two porous plates obtained are as shown in Table 1.

TABLE I

| | | |
|---|---|---|
| Weight % Polymer in Solution | 5% | 10% |
| Weight of Original Mixture | 4.8g. | 5.45g. |
| Weight After 5 Hrs. in Vacuum | 1.1g. | 2.3g. |
| Weight After 30 Hrs. in Vacuum | 0.245g. | 0.58g. |
| Density of Porous Plate | 0.10g./ml. | 0.20g./ml. |
| Calculated Density with no Shrinkage | 0.07g./ml. | 0.14g./ml |
| Shrinkage in Width and Length | 7% | 5–6% |

Electron scanning micrographs show a predominantly open pore structure composed of fibrous polymer strands which are interconnected. Two portions of each porous plate were heated under nitrogen from 25° to 200° over a 1 hour period and then one sample from each porous plate was rapidly heated to 350° and maintained at that temmperature for 1 hour and one sample from each porous plate was heated rapidly to 900° and held at that temperature for 12 hours. No change in dimensions were noted during the heating. The samples heated to 350° were bronze in color due to incomplete carbonization whereas the samples heated to 900° were black and displayed electrical conductivity. All samples were rigid and could be handled easily without fracture.

A sample of the 10 weight percent solution was poured onto a glass casting surface. When cool, the cast plate was placed in acetone bath for 16 hours at 25°. The plate was removed from the bath and dried in a slow 25° air stream. The observed shrinkage in length and width was approximately 15%, which was a larger value than was found after removal of the dichlorobenzene by sublimation (5–6%) yet sufficiently low to produce a highly porous plate.

EXAMPLE 2

A solution of 0.70 g. of the polymer of Example 1 in 9.0 g. of p-dibromobenzene was prepared by heating the mixture with rapid stirring in an oil bath held at 160°. When the mixture had reached 115°, it had become a clear light yellow solution which was poured while still hot onto a glass casting surface which had been preheated to 110°. The coated glass casting surface was placed in a fume hood in a slow 25° air stream. Crystallization of the dibromobenzene occurred radidly as the solution cooled to form an almost white solid plate on the casting surface. During the crystallization, a "front" moved across the solid surface apparently due to the change in reflectivity as the p-dibromobenzene-polyacetylene phase solidified.

Since the p-dibromobenzene does not sublime as readily as p-dichlorobenzene, it was removed from the cast plate by placing the plate in a vacuum chamber heated to 65°C. and evacuated to 10 mm. Hg. Within four hours, 70% of the dibromobenzene had sublimed and after 8 hours essentially all of the dibromobenzene was gone. The sample size had decreased by 5% in each long dimension and 30% in thickness. The porous plate had a density of approximately 0.25 g./ml.

EXAMPLE 3

A polymer having the same composition as Example 1 was prepared in the same way except the amount of monomer was adjusted so that the concentration of the final polymer solution was 17% by weight of the polymer per volume of the solvent. Without isolating the polymer from the solution and while still hot, it was poured into a cylindrical mold having an inside diameter of 20 mm. On cooling to room temperature, it formed a rubbery, solid mass which was opaque and had a green-brown color due, in part, to the copper catalyst.

Some shrinkage had occurred during cooling so that the cast cylinder was easily removed from the mold giving a smooth, solid cylindrical piece with a diameter of 19 mm. This cylinder was easily cut with a knife. After dividing into two portions, one portion was left to dry in air over a several-day period, during which time considerable shrinkage occurred and small copper salt crystals formed at the surface with some additional copper salts remaining in the sample. The second portion was soaked in 500 ml. of acetone for 3 days with the acetone become bright green indicating substantial extraction of copper salts.

Measurements made immediately after removing from the acetone while the sample was still wet showed that the weight had decreased from 35.3 g. to 17 g. while the diameter had only decreased from 19 to 17 mm. Further soaking in fresh, hot acetone reduced the weight to 16 g. without any detectable additional shrinkage. The still-wet sample was divided into three portions weighing 4.9 g., 5.6 g. and 5.3 g., respectively. The first was dried in vacuum overnight and the second sample was air dried overnight. They both shrank isotropically with the diameter decreasing to 9.5 mm. The first sample weighed 1.1 g. and the second sample 1.4 g. Their volumes correspond to 15% of the original volume and are equal to the initial volume percent of the polymer in the reaction mixture. The color of the samples indicated that almost all of the copper salt had been removed although further extraction could have removed the additional trace amount remaining. The third sample was placed in a Soxhlet extractor and extracted with hot acetone for 20 hours and then heated for 20 hours at 120°C. in toluene to crosslink the resin. The sample was then divided into two portions and one portion heated an additional 5 hours at 110° in toluene. After air drying, the two cylinders had diameters of 9.8 and 9.9 mm., respectively,, showing that the crosslinked material had undergone almost as much shrinkage as the uncrosslinked material.

EXAMPLE 4

To study the effect of different solvents, identical samples were cast in a 20 mm. inside diameter mold from a solution so that each cylinder contained 1 g. of the copolymer described in Example 1, dissolved in 7 ml. of o-dichlorobenzene. After extraction of one sample for four hours in a Soxhlet apparatus with acetone, the sample, after drying, weighed 14% of the original, had a length 54% of the original and a diameter 53% of the original. Its density was 1.14 g./ml. showing that at this point not all of the o-dichlorobenzene had been extracted. Two samples where methanol and n-hexane were used in place of acetone shrank nonuniformly. In addition, the n-hexane did not extract any of the copper salt. A sample where tetrahydrofuran was used in place of the acetone gave a wet extracted sample which was very soft and difficult to handle and on drying the cylinder shrank more in the center than it did at its two ends with the surface of the center shrinking nonuniformly to form a wrinkled surface with axially oriented creases.

EXAMPLE 5

In view of the results in the preceding examples showing that the o-dichlorobenzene had not been all removed by the acetone, tests were run using cylindrical samples as described in Example 4 and various extraction times with acetone with the following results:

TABLE II

| Extraction Time (hr.) | Wt. after Extraction (% of Initial wt.) Wet | Dry | Diameter (mm.) Initial (wet) | Extracted (dry) | Final Density (g./cc) |
|---|---|---|---|---|---|
| 3 | 49 | 15.6 | 19.1 | 10.8 | 1.219 |
| 5.5 | 49 | 11.9 | 19.1 | 10.2 | 1.112 |
| 22 | 44 | 11.3 | 19.1 | 10.0 | 1.098 |
| 46[a] | 46 | 11.3 | 19.1 | 9.9 | 1.098 |

[a]Fresh acetone after 24 hours.

EXAMPLE 6

Two hot solutions of the polymer described in Example 1, in o-dichlorobenzene, were cooled in a 20 mm. I.D. cylindrical mold. The solid products were removed carefully to retain the cylindrical shape, then extracted for 18 hours with acetone in a Soxhlet apparatus, dried for 5 hours in air and finally 20 hours in a vacuum. A description of each follows:

| | | |
|---|---|---|
| Initial Polymer Conc. | 4% | 6% |
| Initial Consistency (DCB Present) | Soft, easily broken | Moderately firm, rubbery |
| Sample weight | | |
| Initial (DCB present) | 17g. | 17g. |
| Extracted (acetone present) | 6.8g. | 7.5g. |
| Dried | 0.73g. | 1.04g. |
| Sample Diameter | | |
| Initial | 19mm. | 19mm. |
| Extracted | 15.5mm. | 17mm. |
| Dried | 7.4mm. | 8.4mm. |
| Density (dried) | 1.09g./cm³ | 1.08g./cm³ |

The 4% concentration represents the minimum concentration which allows convenient handling of the sample. In each of these examples the shrinkage, although considerable, was isotropic.

When the above example at the higher concentration was repeated using nitrobenzene and monochlorobenzene as solvents in place of the o-dichlorobenzene, similar results were obtained.

From the above results, it is readily seen that my process permits the making of shaped articles which would be extremely difficult if not impossible to make from these acetylenic polymers by the usual techniques of shaping polymeric materials. In addition to the above specific acetylenic polymers used in the examples, other acetylenic polymers falling within the compositional range of this invention can be used in the same manner to likewise produce useful objects of a particular disired shape and thereafter, if desired, thermolyzed to produce the same shaped article in the form of a carbon object which then can be heated to still higher temperatures to convert the carbon object into either vitreous carbon or into graphite objects of the same shape.

Although the above examples have illustrated many modifications of my invention, obviously, other modifications and variations of the present invention are possible in light of the above teachings. For example, in addition to the above shaped articles, I can make tubes by rotational casting of a hot solution of any of the polymers of this invention in a cylindrical mold rotated on its cylindrical axis, using sufficient solution to coat the inside walls of the mold to the desired thickness during rotation at a sufficient speed that centrifugal force causes the solution to uniformly coat the walls. After the mixture congeals, the solvent is removed in the usual manner. The hot solution can be generated or introduced, for example, by injection or extrusion, into a mold cavity between male and female mold members. After congealing the solutions the molded part is removed from the cavity and the solvent extracted. Where holes are desired in any of the shaped articles, these are readily cut, punched or drilled prior to or after partial removal of the solvent. These as well as many other modifications will be readily apparent to those skilled in the art in light of the above teachings. It is, therefore, to be understood that changes may be made in the particular embodiments of the invention described which are within the full intended scope of the invention as defined by the appended claims.

What i claim as new and desire to secure by Letters Patent of the United States is:

1. The process of making a shaped object from a mixture consisting essentially of:
   A. an acetylenic polymer having at least 10 repeating units which are a. 80–95% units having the formula
   −C≡C−R−C≡C−,
   and
b. 5–20% units having the formula
   +C≡C−CH₂−O−R′−(X−R′)ₙ0−CH₂−C≡C+ where n is 0 or 1, R is phenylene having from 0–4 halo or lower alkyl substituents, said phenylene being 0–12% p-phenylene, and the balance being m-phenylene and R′ is phenylene having 0–4 halo or lower alkyl substituents and X is a direct bond joining the two R′ groups, −O−,

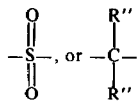

where R″ is lower alkyl, and

B. a nitrobenzene, a halobenzene, or a mixture thereof solvent having a boiling point greater than 100°C. at 760 mm., which at room temperature, is entirely
   a. liquid, or
   b. crystalline,
   which comprises
   1. heating a mixture of (A) and (B) to a temperature where the mixture forms a stable, homogeneous solution contaning at least 4% by weight of (A) and thereafter cooling the hot mixture in contact with at least one shaping surface to a temperature where the mixture congeals to a solid containig both (A) and (B), subject to the proviso that said solid have a maximum material thickness of 250 mils when (B) is crystalline at room temperature, and thereafter
   2. removing the nitrobenzene, the halobenzene, or the mixture thereof contained in said solid by contacting said mixture of (A) and (B) with
C. an acetone extraction solvent which is (a) a nonsolvent for said acetylenic polymer (A), and (b) a solvent for said (B) solvent, or by sublimating said (B) solvent wherein the resulting shaped object is isotropically shrunk during said removing.

2. The process of claim 1, wherein the halobenzene is a dichlorobenzene which is liquid at room temperature.

3. The process of claim 1, wherein the halobenzene is essentially pure p-dichlorobenzene.

4. The process of claim 1, wherein the dipropargyl ether is the dipropargyl ether of 4,4′-isopropylidenediphenol.

5. The process of claim 1, wherein the polymer is an acetylenic polymer of 80–85% m-diethynylbenzene, 5–10% p-diethynylbenzene and 10–15% of the dipropargyl ether of 4,4′-isopropylidenediphenol, the percentages of the three components totaling 100%.

6. The process of claim 1, wherein said (B) solvent at room temperature is crystalline.

7. The process of claim 6, wherein said (B) solvent is selected from the group consisting of p-dichlorobenzene, p-dibromobenzene, p-diiodobenzene, p-bromochlorobenzene, p-bromoiodobenzene, p-chloroiodobenzene, 1,2,3-trichlorobenzene or 1,3,5-trichlorobenzene.

8. The process of producing a shaped article consisting essentially of carbon which comprises forming the desired shape from an acetylenic polymer by the process of claim 1 and thereafter thermally decomposing the shaped acetylenic polymer to the shaped carbon article.

9. The process of claim 8, wherein the halobenzene, is a dichlorobenzene which is liquid at room temperature.

10. The process of claim 8, wherein the halobenzene is essentially pure p-dichlorobenzene.

11. The process of claim 8, wherein the dipropargyl ether is a dipropargyl ether of 4,4′-isopropylidenediphenol.

12. The process of claim 8, wherein the polymer is the acetylenic polymer of 80–85% m-diethynylbenzene, 5–10% p-diethynylbenzene, and 10–15% of the diporpargyl ether of 4,4′-isopropylidenediphenol, the percentages of the three components totaling 100%.

* * * * *